United States Patent [19]

Elsen

[11] Patent Number: 5,300,310

[45] Date of Patent: Apr. 5, 1994

[54] PURPLE COLORED BEVERAGES BRIGHTENED WITH CLOUDING AGENTS

[75] Inventor: Kathleen M. Elsen, Cincinnati, Ohio

[73] Assignee: The Procter & Gamble Company, Cincinnati, Ohio

[21] Appl. No.: 35,820

[22] Filed: Mar. 23, 1993

[51] Int. Cl.$^5$ .............................................. A23L 2/00
[52] U.S. Cl. .................................. 426/540; 426/250; 426/590
[58] Field of Search ............... 426/250, 540, 590, 591, 426/599

[56] References Cited

U.S. PATENT DOCUMENTS

| | | | |
|---|---|---|---|
| 3,658,552 | 4/1972 | Carlson et al. | 99/78 |
| 4,139,645 | 2/1979 | Werner | 426/540 |
| 4,167,587 | 9/1979 | Danforth | 426/250 |
| 4,479,974 | 10/1984 | Schenz | 426/590 |
| 4,529,613 | 7/1985 | Mezzino et al. | 426/590 |

*Primary Examiner*—Jeanette Hunter
*Attorney, Agent, or Firm*—William J. Winter; George W. Allen

[57] ABSTRACT

Disclosed are beverage products which contain artificial purple-producing dyes and have an improved, brightened purple color. The beverage products contain a liquid beverage component having a light transmittance of not less than about 30%. The beverage products also contain from about 500 to 1200 ppm of a clouding agent, from about 3.5 to 11.5 ppm of FD&C Blue Dye No. 1 and from about 10.5 to 34.5 ppm of FD&C Red Dye No. 40. The weight ratio of the Red to Blue Dye is from about 2.3:1 to 5.6:1. The purple colored beverages have a Hunter L color of from about 23.9 to 10.0, a Hunter a-color of from about 12.7 to 7.4, and a Hunter b-color of from about −2.1 to 2.0. The present invention is particularly useful when applied to shelf stable beverages.

8 Claims, No Drawings

PURPLE COLORED BEVERAGES BRIGHTENED WITH CLOUDING AGENTS

FIELD OF THE INVENTION

This invention relates to brightened purple colored beverage products containing FD&C colorants and clouding agents.

BACKGROUND OF THE INVENTION

Grape flavored beverages typically contain natural or artificial colorants which impart a purple color to the beverage. The purple color of such beverages is normally the first sensory quality by which grape flavored beverages are judged by consumers. Consumers initially associate beverage quality, flavor and strength with beverage color. They are conditioned to expect that grape juice or grape flavored drinks have a certain bright purple appearance. Deviation from such an appearance can alter not only one's initial impression of the beverage quality, flavor and strength, but also ones flavor perception when actually consuming the beverage.

This highly desirable bright purple appearance is easily obtained by adding "natural" colorants such as enocianina (grape skin extract) to grape flavored beverages. "Natural" colorants are those obtained from vegetable, animal, or mineral sources or are synthetic duplicates of naturally occurring colorants. There are currently about 21 such "natural" colors approved by the U.S. Food and Drug Administration (FDA) for use as food additives. However, such "natural" colorants are not typically used in shelf stable beverages. Shelf-stable beverages are normally subjected to high temperature sterilization prior to packaging which can destroy these "natural" colorants. Notwithstanding this inability to withstand such sterilization conditions, these "natural" colorants are also degraded when exposed to prolonged ambient temperatures (e.g., store shelf temperatures).

Shelf-stable beverages have therefore been colored with the more heat-stable artificial colorants (FD&C colorants). There are currently about nine FD&C colorants approved as food additives. FD&C colorants tend to be more heat stable than "natural" colorants and can be subjected to sterilization processes as well as prolonged ambient shelf temperatures without substantial degradation. However, the use of FD&C purple-producing colorants in shelf stable beverages has heretofore resulted in blackish or extremely dark-purple colored shelf stable beverages. Dilution of these FD&C colorants can eliminate this undesirable blackish appearance but then results in a commercially undesirable grayish-purple color.

Given the foregoing, there remains a need to provide purple colored shelf stable beverages with a brightened, more desirable, purple coloration.

SUMMARY OF THE INVENTION

The present invention is directed to brightened purple colored beverage products. The present invention is particularly useful when applied to purple colored, shelf stable beverages. The beverage product of the present invention comprises a liquid beverage component (beverage product less clouding agent and FD&C dyes) having a light transmittance of not less than about 30%. The beverage product also comprises from about 3.5 to 11.5 ppm of FD&C Blue Dye No. 1, from about 10.5 to 34.5 ppm of FD&C Red Dye No.40., and from about 500 to 1200 ppm of a clouding agent. The weight ratio of the Red to Blue Dye is from about 2.1:1 to 5.6:1. The purple-colored beverage product has a Hunter L-color of from about 26.7 to 10.0, a Hunter a-color of from about 12.8 to 7.4 and a Hunter b-color of from about −2.6 to 2.0.

DETAILED DESCRIPTION OF THE INVENTION

The beverage product of the present invention pertains to chilled or shelf stable, purple-colored, beverage products. The essential components of such products are described in detail as follows:

A. Beverage Component

The product of the present invention comprises a conventional liquid beverage component in combination with certain FD&C colorants described hereinafter and a clouding agent also described hereinafter. As used herein, "beverage component" refers to the beverage product of the present invention less clouding agents and FD&C colorants. This beverage component can be artificially or naturally flavored and comprise from 0 to 100% by weight of fruit juice. The beverage component, however, must have a light transmittance of not less than about 30%, preferably not less than about 45%. Lower percentages of light transmittance will render the clouding agent (described hereinafter) ineffective in brightening the purple color of the beverage product. Light transmittance of the beverage component can be measured via conventional spectrophotometry methods using distilled water (100% light transmittance) as a control standard.

The beverage product of the present invention can be a chilled or shelf stable beverage product, but is preferably a shelf stable beverage product. As used herein, "shelf stable" refers to packaged beverages that do not require refrigeration while stored at ambient temperatures for prolonged periods (e.g., more than about 10 days). To provide for such stability, shelf stable beverages typically contain preservatives (e.g., benzoates, sorbates, etc.) and are heat-pasteurized prior to packaging. Conversely, "chilled" beverages are those packaged beverages that require refrigeration during storage. Chilled beverages can often be stored under ambient conditions for only a short time (e.g., up to about 10 days). It should be noted that although the present invention embodies both chilled and shelf stable beverages, it is most useful when applied to shelf stable beverages. Unlike chilled beverages that can contain both natural and FD&C purple-producing colorants, shelf stable beverages can normally contain only FD&C colorants. These FD&C colorants have heretofore produced only blackish appearing purple-colored beverages.

B. FD&C Colorants

The purple beverage product of the present invention comprises certain combinations of FD&C Blue Dye No. 1 (Brilliant Blue FCF, CI Food Blue 2, color index no. 42090) and FD&C Red Dye No. 40 (allur red, EI Food Red 17, color index no. 16035). This combination provides a purple coloration to the beverage product.

Specifically, the purple beverage product comprises from about 3.5 to 11.5 ppm, preferably from about 4 to 7 ppm of FD&C Blue Dye No. 1, and from about 10.5 to 34.5 ppm, preferably from about 12 to 21 ppm of FD&C Red Dye No. 40, wherein the weight ratio of the Red to Blue Dye is from about 2.1:1 to 5.6:1, preferably from about 2.3:1 to 4:1. These combinations of FD&C Blue and Red Dyes can be added to beverage products, especially shelf stable beverage products, in the above cited concentrations and weight ratios to provide a purple color to the beverage. FD&C beverage colorants are discussed by D. Marmion, *Handbook of U.S. Colorants,* (3rd ed. 1991), which is incorporated herein by reference.

The purple color provided by these FD&C colorants has a visually blackish appearance. It is only when a clouding agent as described hereinafter is combined with these colorants is the undesirable blackish appearance replaced by a brightened purple coloration.

C. Clouding Agent

The purple colored beverage product of the present invention also comprises a clouding agent. The clouding agent acts to brighten the purple-colored beverage product.

Specifically, the purple colored beverage product comprises from about 500 to 1200 ppm, preferably from about 600 to 800 ppm of a clouding agent. The clouding agent utilized must be chemically compatible with FD&C colorants and provide a stable suspension of cloud-producing particulates in the beverage product. The suspended particulates can be solid (e.g., silica, titanium dioxide) or liquid (e.g., animal, plant or synthetic oil/fat). These suspended particulates should be substantially uniform in size and be less than about 3 micrometers in diameter, preferably from about 1 to 3 micrometers in diameter.

The clouding agent for use in the purple-colored beverage product can be an oil-in-water emulsion such as neutral or citrus Oil clouding agents. Neutral clouding agents are preferred. The oil phase of such emulsions comprises a weighting agent and a vegetable oil (as in neutral clouding agents) or a flavored oil (as in citrus oil clouding agents). The vegetable oil in the preferred neutral clouding agent can be substituted with animal oils, synthetic oils, mixtures thereof, and mixtures thereof with vegetable oils and/or flavored oils. Suitable weighting agents for use in the clouding agent include brominated vegetable oils and soluble gums. Preferably, the weighting agent is a soluble gum. The soluble soluble gum is preferably a rosin ester, more preferably the glycerol ester of wood rosin. When glycerol ester of wood rosin is utilized in the beverage product, FDA regulations limit its concentrations to not more than 100 ppm. Other components of the clouding agent will typically include emulsifiers and emulsion stabilizers such as gums, pectins, celluloses, polysorbates, sorbitan esters and proplyene glycol alginates. Preservatives such as sorbates and benzoates are also typically added to the clouding agent and/or the finished beverage product.

Although the general use of clouding agents in beverage products is well known, the use of such materials to brighten purple colored beverage products was not heretofore known. Clouding agents are described by L. Green, *Developments in Soft Drinks Technology, Vol.* 1, 87–100 (1978), and by J.Woodroof, G. Phillips, *Beverages: Carbonated and Noncarbonated,* 152–207 (rev. ed. 1981), each of which is incorporated herein by reference. Clouding agents are commonly added to beverages to provide a juice-like appearance and mouthfeel to beverage products. However, clouding agents have not heretofore been added to purple, artificially-colored beverages in amounts sufficient to produce the brightened purple coloration of the beverage product of the present invention. It has now been found that the concentration of clouding agents described herein acts to brighten the purple color of beverage products containing FD&C colorants. The improved brightened purple color so produced is more similar to the highly desirable purple color produced from "natural" colorants than the typical blackish purple color produced from FD&C colorants.

The Hunter color scale system can be used to help define the brightened purple color of the beverage product described herein. The Hunter system is described by R. S. Hunter, "Photoelectric Color Difference Meter," *Journal of the Optical Society of America,* 48, 985–995 (1958), and U.S. Pat. No. 3,003,388 to Hunter et al., issued Oct. 10, 1961, both of which are incorporated herein by reference. The purple colored beverage product of the present invention has a Hunter L-color of from about 23.9 to 10.0, preferably from about 17.9 to 11.6; a Hunter a-color of from about 12.7 to 7.4, preferably from about 11.7 to 8.1; and a Hunter b-color of from about −2.1 to 2.0, preferably from about −1.6 to −2.0 By contrast, conventional purple colored beverages containing only FD&C purple-producing colorants (no clouding agent) typically require higher levels of such colorants and have a Hunter L color of from about 18.4 to 11.5, a Hunter a-color of from about 20.9 to 11.8, and a Hunter b-color of from about −3.1 to −3.6.

The brightened purple color of the beverage product described herein can also be subjectively characterized by visual inspection. While held in a transparent package (e.g., 1 liter glass bottle), the beverage product has a distinctive bright purple color. When a similar beverage without cloud (or with less than 500 ppm of cloud) is placed in such a package, the beverage has a blackish appearance. A purple color can be seen in the black- −appearing beverage only when a light source is positioned behind the beverage container. No such light source is necessary for visualizing the brightened purple color of the beverage product of the present invention.

EXAMPLE

The purple−colored beverage product of the present invention is illustrated by the following example.

| Ingredients | Concentration (wt %) |
| --- | --- |
| Beverage Component | |
| water | 73.99133 |
| sugar | 15.49002 |
| juice from concentrate | 10.00000 |
| citric acid | 0.24070 |
| natural and artificial flavors | 0.12050 |
| ascorbic acid | 0.05310 |
| pectin | 0.02970 |
| sodium benzoate | 0.00242 |
| Colorant & Clouding Agent | |
| FD & C red no. 40 | 0.00180 (18 ppm) |
| FD & C blue no. 1 | 0.00060 (6 ppm) |
| Quest Clouding agent (oil-in-water emulsion with glycerol ester of wood rosin as weighting agent, manufactured by Quest International) | 0.07000 (700 ppm) |

The beverage component (47.8% light transmittance), colorants and clouding agent are combined and processed by conventional means into a shelf stable beverage. The shelf stable beverage so produced has a Hunter L-color of 15.2, a Hunter a−color of 10.4 and a Hunter b-color of 0.4. When packaged in transparent one liter glass bottles, the shelf stable beverage has a brightened, distinctly purple, appearance.

What is claimed is:

1. A purple colored beverage product comprising:
   a) a liquid beverage component having a light transmittance of not less than about 30%,
   b) from about 3.5 to 11.5 ppm of FD&C Blue Dye No. 1,
   c) from about 10.5 to 34.5 ppm of FD&C Red Dye No.40 wherein the weight ratio of said Red Dye to said Blue Dye is from about 2.1:1 to 5.6:1, and
   d) from about 500 to 1200 ppm of a clouding agent;
wherein the purple colored beverage product has a Hunter L-color of from about 23.9 to 10.0, a Hunter a-color of from about 12.7 to 7.4, and a Hunter-b color of from about −2.1 to 2.0.

2. The purple colored beverage product of claim 1 wherein the liquid beverage component has a light transmittance of not less than about 45%.

3. The purple colored beverage product of claim 1 wherein said beverage product comprises from about 600 to 800 ppm of a clouding agent.

4. The purple colored beverage product of claim 1 wherein the clouding agent is a neutral clouding agent.

5. The purple colored beverage product of claim 4 wherein the neutral clouding agent comprises a water soluble gum as a weighting agent.

6. The purple colored beverage product of claim 5 wherein the water soluble gum is a glycerol ester of wood rosin.

7. The purple colored beverage product of claim 1 wherein the weight ratio of said Red Dye to said Blue Dye is from about 2.3:1 to 4:1.

8. The purple colored beverage product of claim 1 wherein said beverage product is shelf stable.

* * * * *